(12) United States Patent
Shin et al.

(10) Patent No.: US 11,607,638 B2
(45) Date of Patent: Mar. 21, 2023

(54) FILTER ASSEMBLY AND AIR CLEANER HAVING THE SAME

(71) Applicant: SAMSUNG ELECTRONICS CO., LTD., Suwon-si Gyeonggi-do (KR)

(72) Inventors: Dong-woo Shin, Suwon-si (KR); Sang-hoon Lee, Suwon-si (KR); Young-chul Ko, Suwon-si (KR); Hyun-joo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 16/630,263

(22) PCT Filed: Aug. 3, 2018

(86) PCT No.: PCT/KR2018/008834
§ 371 (c)(1),
(2) Date: Jan. 10, 2020

(87) PCT Pub. No.: WO2019/054630
PCT Pub. Date: Mar. 21, 2019

(65) Prior Publication Data
US 2021/0113948 A1    Apr. 22, 2021

(30) Foreign Application Priority Data
Sep. 13, 2017 (KR) .......... 10-2017-0116908

(51) Int. Cl.
*B01D 46/00* (2022.01)
*B01D 46/52* (2006.01)
(Continued)

(52) U.S. Cl.
CPC ......... *B01D 46/58* (2022.01); *B01D 39/2058* (2013.01); *B01D 46/0005* (2013.01);
(Continued)

(58) Field of Classification Search
CPC .............. B01D 46/002; B01D 46/0005; B01D 46/0013; B01D 46/0023; B01D 46/0038;
(Continued)

(56) References Cited

U.S. PATENT DOCUMENTS 4,193,780 A * 3/1980 Cotton, Jr. ............. B01D 46/06
  210/485
5,080,699 A * 1/1992 Ho ........................... F24F 8/10
  55/495
(Continued)

FOREIGN PATENT DOCUMENTS

JP    10-192626    7/1998
JP    2005-313144  11/2005
(Continued)

OTHER PUBLICATIONS

International Search Report dated Nov. 15, 2018 in corresponding International Patent Application No. PCT/KR2018/008834.
(Continued)

*Primary Examiner* — Robert A Hopkins
*Assistant Examiner* — Qianping He
(74) *Attorney, Agent, or Firm* — Staas & Halsey LLP

(57) ABSTRACT

A filter assembly is provided. The filter assembly includes a plurality of filter modules each filled with activated carbon and continuously connected; and a frame to which the plurality of filter modules are fixed, wherein the plurality of filter modules are disposed at predetermined angles relative to each other.

12 Claims, 14 Drawing Sheets

(51) Int. Cl.
  *B01D 39/20* (2006.01)
  *B01D 46/58* (2022.01)
  *B01D 46/62* (2022.01)

(52) U.S. Cl.
  CPC ..... *B01D 46/0013* (2013.01); *B01D 46/0036* (2013.01); *B01D 46/0038* (2013.01); *B01D 46/521* (2013.01); *B01D 46/62* (2022.01); *B01D 2239/045* (2013.01); *B01D 2239/0407* (2013.01); *B01D 2267/30* (2013.01)

(58) Field of Classification Search
  CPC .............. B01D 46/521; B01D 39/2058; B01D 2239/0407; B01D 2239/046; B01D 2267/30; B01D 53/02; B01D 53/114; B01D 53/62; B01D 2101/02; B01D 2253/102; B01D 46/023; B01D 46/02; B01D 46/06; B01D 46/185
  USPC .... 96/135, 138, 151; 55/482, 484, 493, 497, 55/521, 483
  See application file for complete search history.

(56) References Cited

U.S. PATENT DOCUMENTS

| | | | |
|---|---|---|---|
| 5,733,350 A * | 3/1998 | Muller | B01D 53/0407 55/482 |
| 6,001,151 A | 12/1999 | Elshout | |
| 7,377,963 B2 | 5/2008 | Tanahashi et al. | |
| 7,585,346 B2 * | 9/2009 | Roseberry | B01D 46/62 96/138 |
| 8,968,445 B2 | 3/2015 | Lindahl et al. | |
| 10,486,095 B2 | 11/2019 | Yang et al. | |
| 2005/0166559 A1 * | 8/2005 | Gillingham | F02M 35/024 55/481 |
| 2015/0224434 A1 * | 8/2015 | Hedlund | F24F 8/10 55/495 |
| 2017/0184063 A1 * | 6/2017 | Maeno | B01D 46/008 |
| 2018/0169557 A1 | 6/2018 | Yang et al. | |

FOREIGN PATENT DOCUMENTS

| | | | |
|---|---|---|---|
| JP | 2008-253920 | | 10/2008 |
| JP | 2008253920 A | * | 10/2008 |
| JP | 2010-227797 | | 10/2010 |
| JP | 2012-519074 | | 8/2012 |
| KR | 2003-0014186 | | 2/2003 |
| KR | 10-1016331 | | 2/2011 |
| KR | 10-1181418 | | 9/2012 |
| KR | 10-2017-0013619 | | 2/2017 |
| KR | 10-2017-0030805 | | 3/2017 |
| KR | 20170030805 A | * | 3/2017 |
| KR | 10-1776913 | | 9/2017 |

OTHER PUBLICATIONS

Written Opinion of the International Searching Authority dated Nov. 15, 2018 in corresponding International Patent Application No. PCT/KR2018/008834.
Chinese Office Action dated Mar. 18, 2021, in corresponding Chinese Patent Application No. 201880052783.4.
Korean Office Action dated Feb. 16, 2022 in Korean Patent Application No. 10-2017-0116908.
Office Action dated Nov. 15, 2021 in Chinese Application No. 201880052783.4 (12 pages including translation).
Korean Office Action dated Aug. 25, 2022 in Korean Patent Application No. 10-2017-0116908.

* cited by examiner

FILTER ASSEMBLY AND AIR CLEANER HAVING THE SAME

CROSS REFERENCE TO RELATED APPLICATIONS

This application is a National Phase application, under U.S.C. § 371, of International Application No. PCT/KR2018/008834 filed Aug. 3, 2018, which claims priority to Korean Patent Application No. 10-2017-0116908, filed Sep. 13, 2017, the entire disclosures of which are herein incorporated by reference as a part of this application.

TECHNICAL FIELD

Apparatuses and methods consistent with the present disclosure relate to a filter assembly and an air cleaner having the same, and more particularly, to a filter assembly capable of preventing a rise in pressure loss while improving a deodorization performance by arranging a plurality of filter modules in a zigzag manner at predetermined angles and an air cleaner having the same.

BACKGROUND ART

Filters used in an air cleaner are classified into dust collecting filters and deodorization filters according to their functions. The deodorization performance of the deodorization filters is expressed by a CADR (Clean Air Delivery Rate, m3/h). If the air loss through the filter is large, an amount of air passing through the filter is reduced, resulting in a reduction in the CADR. Therefore, the deodorization performance of the deodorization filter should take into consideration both a structure for deodorization and a structure for reducing the pressure loss.

A filter assembly including the deodorization filter used in an existing air cleaner is used by forming a plurality of cells having a honeycomb shape for manufacturing convenience and filling each cell with activated carbon made of small particles.

Conventional honeycomb filter assemblies use each cell filled with about 60% to 70% of activated carbon in each cell. This is to provide a passage through which air may smoothly pass through the honeycomb-shaped filter assembly.

However, since the conventional honeycomb filter assembly may not fully fill the cells with activated carbon, the deodorization performance is inevitably lowered. If each cell is filled with activated carbon (for example, if it is 100% filled) to improve the deodorization performance, activated carbon becomes an obstacle to air flow, resulting in an increase in pressure loss. As a result, an overload occurs in the suction motor, which causes an increase in power consumption.

Therefore, in the case of using the conventional honeycomb-shaped filter assembly, there is a problem that a low deodorization performance is required to be taken to lower the pressure loss.

DISCLOSURE

Technical Problem

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

Technical Solution

The present disclosure provides a filter assembly capable of preventing a rise in pressure loss while improving the deodorization performance by arranging a plurality of filter modules fully filled with activated carbon in a zigzag shape at predetermined angles to each cell.

According to an aspect of the present disclosure, a filter assembly includes a plurality of filter modules each filled with activated carbon and continuously connected, and a frame to which the plurality of filter modules are fixed, wherein the plurality of filter modules are disposed at predetermined angles relative to each other.

The plurality of filter modules may be disposed in a zigzag manner relative to each other.

The filter assembly may further include a net member attached to side surfaces of the filter modules facing each other to connect adjacent filter modules relative to each other.

The net member may have a mesh smaller than a particle size of the activated carbon.

An angle between the plurality of filter modules may be between 10 and 30 degrees.

The plurality of filter modules may include a plurality of cells filled with the activated carbon.

The filter assembly may further include a plurality of air passage holes formed spaced apart from each other on front and rear sides of the plurality of filter modules along a longitudinal direction of the plurality of filter modules.

The frame may include a plurality of guide portions fixing upper and lower ends of the plurality of filter modules to maintain the plurality of filter modules at predetermined angles.

The plurality of guide portions may be engagement grooves into which the upper and lower ends of the plurality of filter modules are inserted.

The plurality of guide portions may be protruding ribs to correspond to outer sides of the upper and lower ends of the plurality of filter modules.

The upper and lower ends of the plurality of filter modules may be attached to an inner surface of the frame.

According to another aspect of the present disclosure, an air cleaner includes a main body having an air outlet formed therein and having a suction motor sucking outside air into an air inlet and configured to discharge the air to outside through the air outlet, a front cover detachably mounted to the main body and having the air inlet formed therein, and a filter assembly disposed in a rear side of the air inlet, wherein the filter assembly includes a plurality of filter modules with a plurality of cells each filled with activated carbon and arranged in a zigzag manner.

Adjacent filter modules relative to each other may be connected by a net member attached to side surfaces of the filter modules facing each other, and the net member may have a mesh smaller than a particle size of the activated carbon.

An angle between the plurality of filter modules may be between 10 and 30 degrees.

The filter assembly may include a frame fixing upper and lower ends of the plurality of filter modules to maintain the plurality of filter modules at predetermined angles.

Additional and/or other aspects and advantages of the disclosure trill be set forth in part in the description which follows and, in part, will be obvious from the description, or may be learned by practice of the disclosure.

DESCRIPTION OF DRAWINGS

The above and/or other aspects of the present disclosure will be more apparent by describing certain exemplary embodiments of the present disclosure with reference to the accompanying drawings, in which.

MODE FOR INVENTION

In order to fully understand the structure and effects of the present disclosure, preferred embodiments of the present disclosure will be described with reference to the accompanying drawings. The present disclosure may, however, be embodied in many different forms and should not be construed as limited to the embodiments set forth herein. It should be understood, however, that the description of the embodiments is provided to enable the disclosure of the present disclosure to be complete, and will fully convey the scope of the invention to a person having ordinary skill in the art to which the present disclosure belongs. In the accompanying drawings, the components are enlarged in size for the sake of convenience of explanation, and the proportions of the components may be exaggerated or reduced.

The terms first, second, etc. may be used to describe various components, but the components should not be limited by the terms. The terms may only be used for the purpose of distinguishing one element from another. For example, without departing from the scope of the present disclosure, the first component may be referred to as a second component, and similarly, the second component may also be referred to as a first component.

The terms used in the embodiments of the present disclosure may be interpreted as commonly known to those skilled in the art unless otherwise defined.

Hereinafter, a schematic structure of an air cleaner according to an exemplary embodiment of the present disclosure will be described with reference to the drawings, and a structure of a filter assembly included in the air cleaner will be described in detail.

Figure 1:
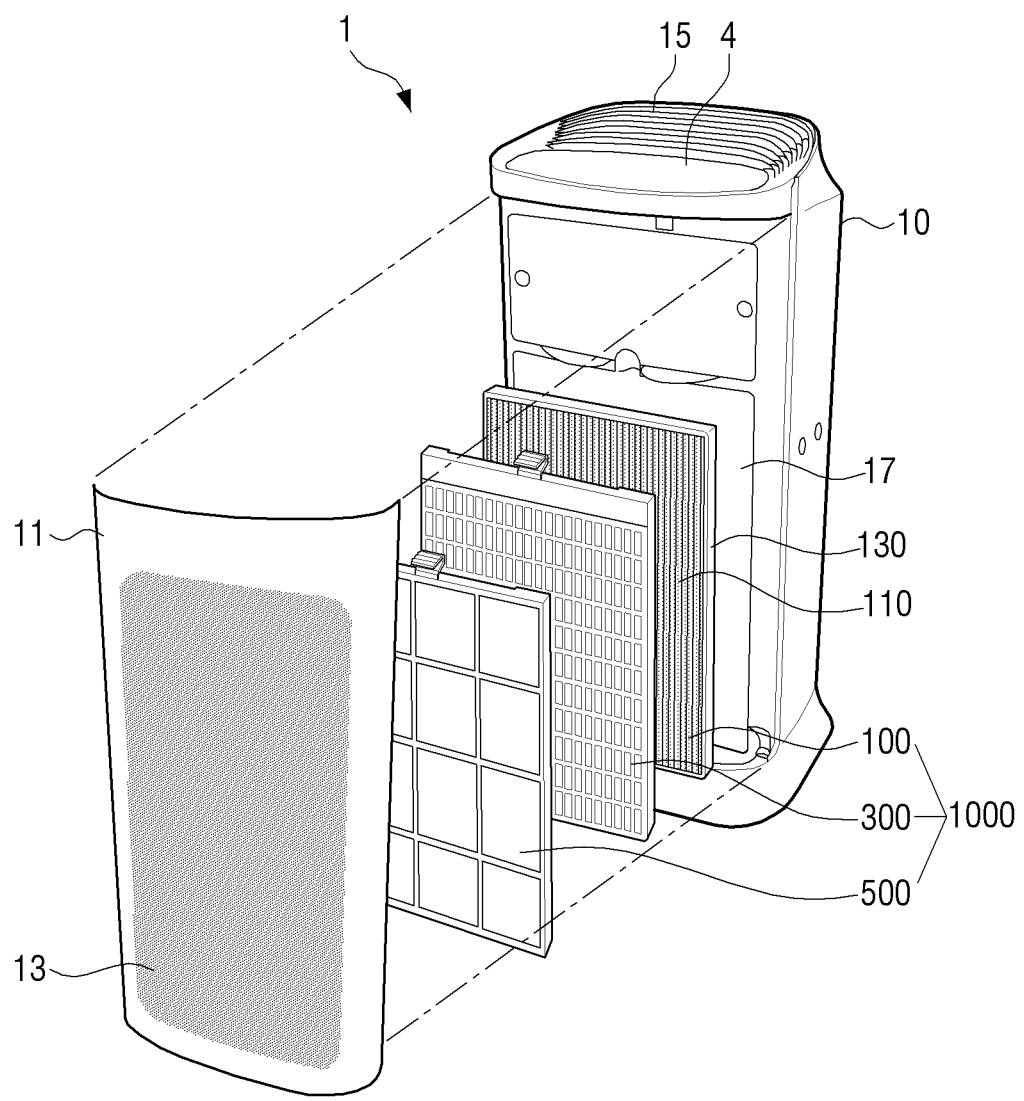
FIG. 1 is an exploded perspective view of an air cleaner according to an exemplary embodiment of the present disclosure.

Referring to FIG. 1, the air cleaner according to an exemplary embodiment of the present disclosure may include a main body 10 having a suction motor (not shown) for forcedly sucking and flowing outside air and a filter unit 1000 disposed interchangeably in the main body 10.

The main body 10 may be provided with an operation panel 4 for user input to perform on/off functions of the air cleaner 1 and various functions.

The operation panel 4 may be disposed on the upper side of the main body 10 to be easily accessible by a user, but it is not limited thereto and may be disposed on the side or rear side of the main body 10. The operation panel 4 may be formed as a touch screen to display an operation state together with the user input. Alternatively, the operation panel 4 may have a separate display and a plurality of input keys arranged around the display.

The main body 10 has a front cover 11 detachably coupled to the front. The front cover 11 is formed with a plurality of small air inlets 13.

The main body 10 forcibly sucks the air outside the main body 10 into the main body 10 through the plurality of air inlets 13 of the front cover 11 as the suction motor is driven. At this time, dust and other contaminants contained in the outside air are collected in the filter unit 1000 through the filter unit 1000.

The main hotly 10 is formed with an air outlet 15 in the upper side of the main body 10 for discharging purified air through the filter unit 1000 to the outside of the main body 10. In this case, the air outlet 15 is not limited to the upper side of the main body 10 but may be formed on the side surface or the rear surface of the main body 10.

A receiving groove 17 for receiving the filter unit 1000 is formed in the front inner side of the main body 10. In this case, the suction motor (not shown) may be disposed downstream of the filter unit 1000 on a suction passage.

The filter unit 1000 includes a filter assembly 100, a filter saver 200, and a pre-filter 300 arranged in order from the inside of the main body 10 toward the front cover 11.

Figure 2:
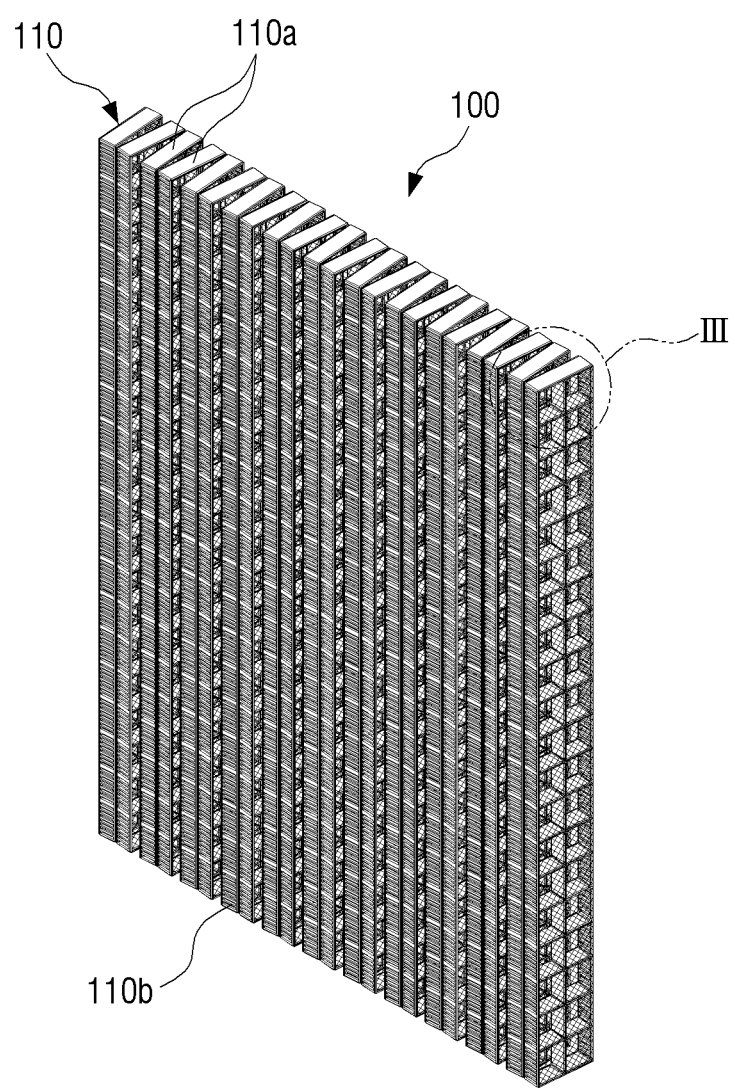
FIG. 2 is a perspective view showing a plurality of filter modules of a filter assembly shown in FIG. 1.

The filter assembly 100 is formed of a deodorant and antimicrobial material that collects ultrafine dust. The filter assembly 100 includes a substantially rectangular shaped frame 130 and a plurality of filter modules 110 in a zigzag manner arranged inside the frame 130 as shown in FIG. 2. Each of a plurality of cells 111 of each of the filter modules 110 is filled with activated carbon 115. A specific structure of the filter assembly 100 will be described later.

The filter saver 200 has an electric dust collecting structure capable of collecting dust through charging. The pre-filter 300 may be formed of a nonwoven fabric, or may be in the form of a metal film or a metal mesh in which eyes of the filter are very compact.

Hereinafter, the structure of the filter assembly 100 will be described in detail with reference to FIGS. 2 to 7.

Figure 3:
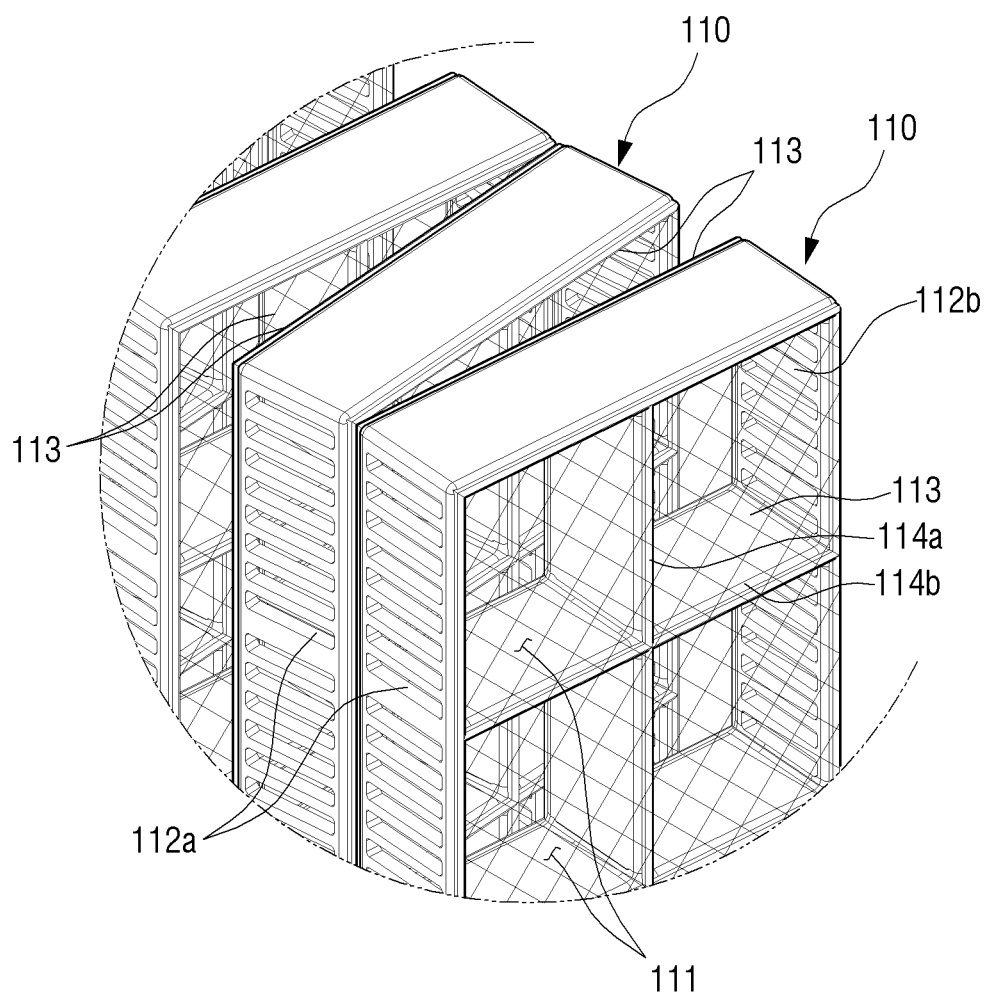
FIG. 3 is an enlarged view showing a portion 111 shown in FIG. 2, wherein activated carbon filled in a plurality of cells of each filter module is removed for convenience of explanation.
Figure 4:
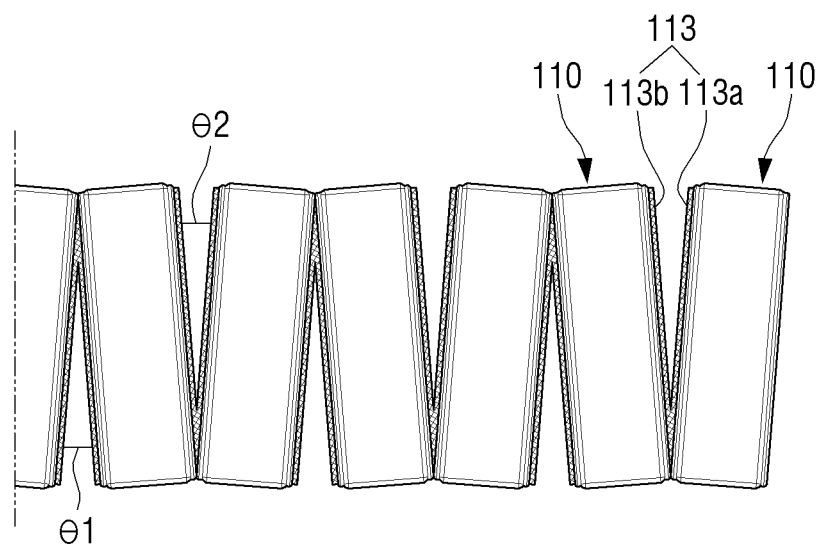
FIG. 4 is a plan view showing a structure in which a plurality of filter modules are connected in a zigzag manner.

FIG. 2 is a perspective view showing the plurality of filter modules 110 of the filter assembly 100 shown in FIG. 1. FIG. 3 is an enlarged view showing a portion III shown in FIG. 2, wherein activated carbon filled in a plurality of cells of each filter module is removed for convenience of explanation. FIG. 4 is a plan view showing a structure in which the plurality of filter modules 110 are connected in a zigzag manner.

The filter assembly 100 includes the plurality of thin and long filter modules 110 as shown in FIG. 2 find a frame 130 (see FIG. 7) for fixing the plurality of filter modules 110.

As shown in FIG. 4, a pair of adjacent filter modules 110 are connected to each other by one net member 113. Accordingly, the plurality of filter modules 110 are continuously connected in a line and simultaneously are arranged in a zigzag manner to have predetermined angles θ1 and θ2 relative to each other.

Referring to FIG. 3, the plurality of cells 111 formed in each of the filter modules 110 are spaces for filling the activated carbon 115, and include vertical barrier ribs 114a arranged along the longitudinal direction of the filter module 110 and a plurality of horizontal barrier ribs 114b across the vertical barrier ribs 114a. Each cell 111 is filled with the activated carbon 115 (in this case, a degree of filling the activated carbon 115 is about 100% or close to 100% in each cell 111).

The shape of the plurality of cells 111 may be square-shaped (or rectangular) as shown in FIG. 3, but the shape is not limited.

Each of the filter modules 110 has a plurality of air passage holes 112a and 112b formed on the front and rear surfaces of the filter module 110 along the longitudinal direction of the filter module 110. The air passage holes 112a and 112b are connected with the plurality of cells 111. Accordingly, air passing through the filter assembly 100 may flow into the cells 111 filled with the activated carbon 115 through the air passage holes 112a and 112b. Therefore, the filter module 110 increases the total area through which air may pass, thereby reducing the pressure loss and improving the deodorization performance. The shape of the air passage holes 112a and 112b is shown to be rectangular as shown in FIG. 3. However, the present disclosure is not limited thereto, and any shape may be used as long as the activated carbon 115 filled in the cell 111 may not escape.

The net member 113 is formed of a flexible material having a mesh smaller than the particle size of the activated carbon 115 such that the activated carbon 115 filled in the cell 111 may not escape. Accordingly, the activated carbon 115 filled in the cell 111 may be maintained in the cell 111 without departing from the cell 111 by the net member 113.

Referring to FIG. 4, in order for the net member 113 to connect a pair of filter modules 110 adjacent to each other, first and second portions 113a and 113b are respectively attached to the side surfaces in which the pair of filter modules 110 face each other. The pair of filter modules 110 are connected through a single net member 113. In this way, the remaining filter modules 110 are connected by the net members 113.

The plurality of filter modules 110 connected by the net members 113 may be connect eel in a line and arranged in a zigzag manner.

Figure 5:
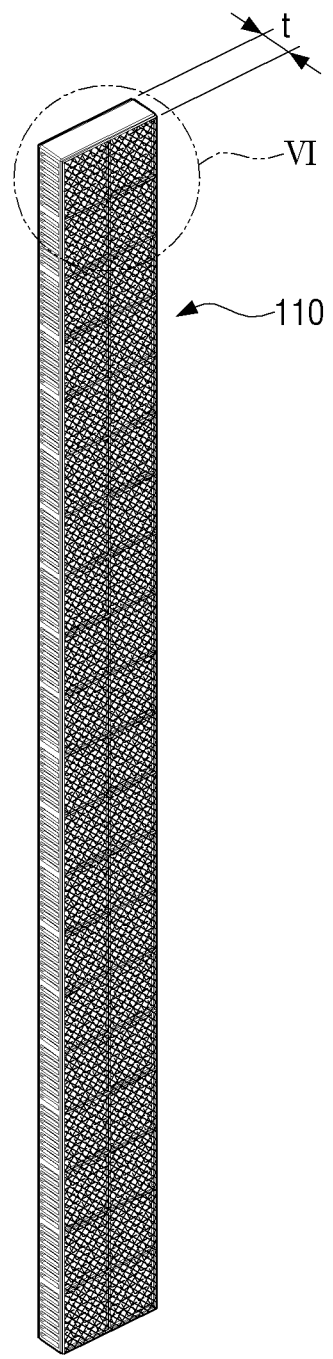
FIG. 5 is a perspective view showing a single filter module.
Figure 6:
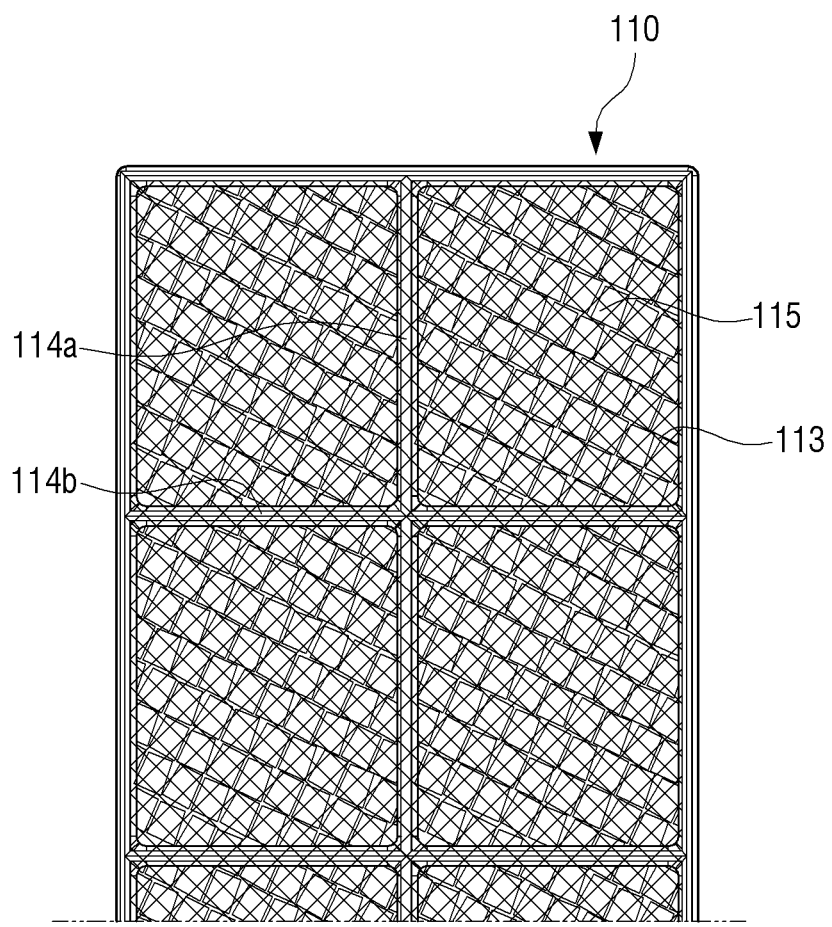
FIG. 6 is an enlarged view showing a portion VI shown in FIG. 5.

FIG. 5 is a perspective view showing the single filter module 110, and FIG. 6 is an enlarged view showing a portion VI shown in FIG. 5.

Referring to FIGS. 5 and 6, the single filter module 110 has a rectangular shape having a certain thickness t.

In the present embodiment, a plurality of filter modules are described as being connected in a line by a plurality of net members. However, the present disclosure is not limited to this, and two net members may be attached to both sides of one filter module respectively. In this case, each of the two net members are manufactured to have an area corresponding to an area of the side surface of the filter module, and thus they are not attached to other filter modules adjacent to the filter module. Thus, all single filter modules may be manufactured in a separated state.

Figure 7:
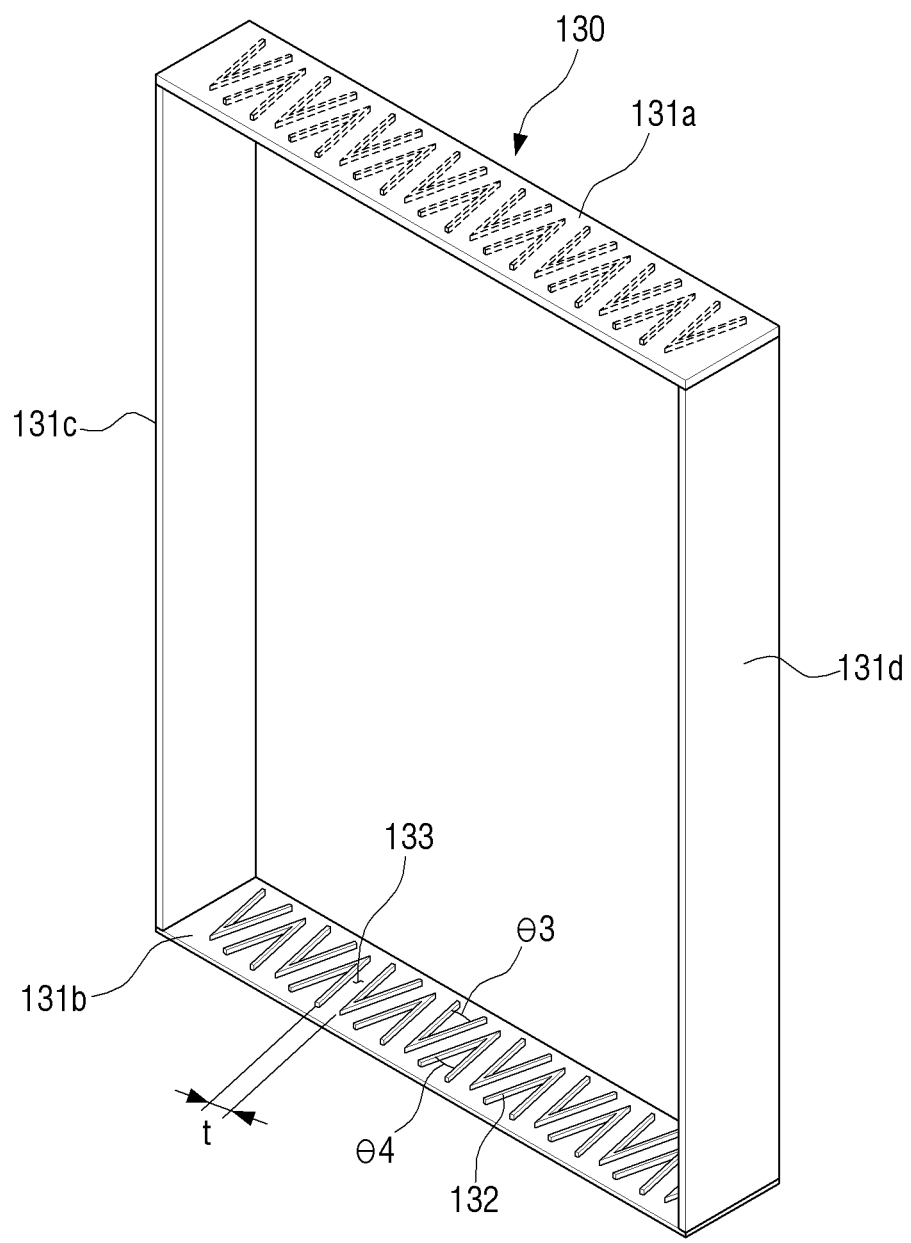
FIG. 7 is a perspective view showing a frame of a filter assembly shown in FIG. 1.

Each of the filter modules 110 may be individually manufactured and separately mounted on the frame 130 (see FIG. 7). In this case, when the single filter module 110 is broken or activated carbon is required to be replaced, the relevant filter module 110 may be removed from the frame 130 and replaced or repaired.

FIG. 7 is a perspective view showing the frame 130 of the filter assembly 100 shown in FIG. 1.

Referring to FIG. 7, the frame 130 may fix the filter module 110 such that the plurality of filter modules 110 remain arranged in a zigzag manner at predetermined angles with respect to each other.

The frame 130 includes an upper portion 131a supporting the upper ends of the plurality of filter modules 110, a lower portion 131b supporting the lower ends of the plurality of filter modules 110, a left side portion 131c and a right side portion 131d respectively connecting both sides of the upper portion 131a and the lower portion 131b. In this case, the left side portion 131c and the right side portion 131d may cover the outer sides of both sides of the plurality of filter modules 110.

A plurality of guide portions 132 fixing upper ends 110a and lower ends 110b of the plurality of filter modules 110 are disposed on a bottom surface of the upper portion 131a and a top surface of the lower portion 131b such that each of the plurality of filter modules 110 may be maintained at the predetermined angles θ1 and θ2 (see FIG. 4).

The guide portions 132 may be protruding V-shaped ribs 132 to correspond to the outer sides of the upper ends 110a and the lower ends 110b of the plurality of filter modules 110 disposed in a zigzag manner. The plurality of ribs 132 are described as being formed on both the bottom surface of the upper portion 131a of the frame 130 and the upper surface of the lower portion 131b of the frame 130 in the present embodiment. However, the present disclosure is not limited thereto, and the plurality of ribs 132 may be formed on only any one of the bottom surface of the upper portion 131a and the upper surface of the lower portion 131b.

Each of the ribs 132 includes angles θ3 and θ4 corresponding to the angles θ1 and θ2 (see FIG. 4) formed by the filter modules 110 and thus the ribs 132 of a V-shape and a shape formed by rotating the V-shape at 180 degrees are alternately disposed. Also, the ribs 132 of the V-shape and the shape formed by rotating the V-shape at 180 degrees are disposed with a gap 133 therebetween. The gap 133 is spaced apart by the thickness t of each of the filter modules 110 such that the upper ends 110a and the lower ends 110b of the filter modules 110 may be stably fixed by the plurality of ribs 132. Meanwhile, frames disposed at the outermost sides of the plurality of filter modules 110 connected in the zigzag manner may be fixed by the rib 132 and the left side portion 131c of the frame 130 and by the rib 132 and the right side portion 131d of the frame 130.

Figure 8:
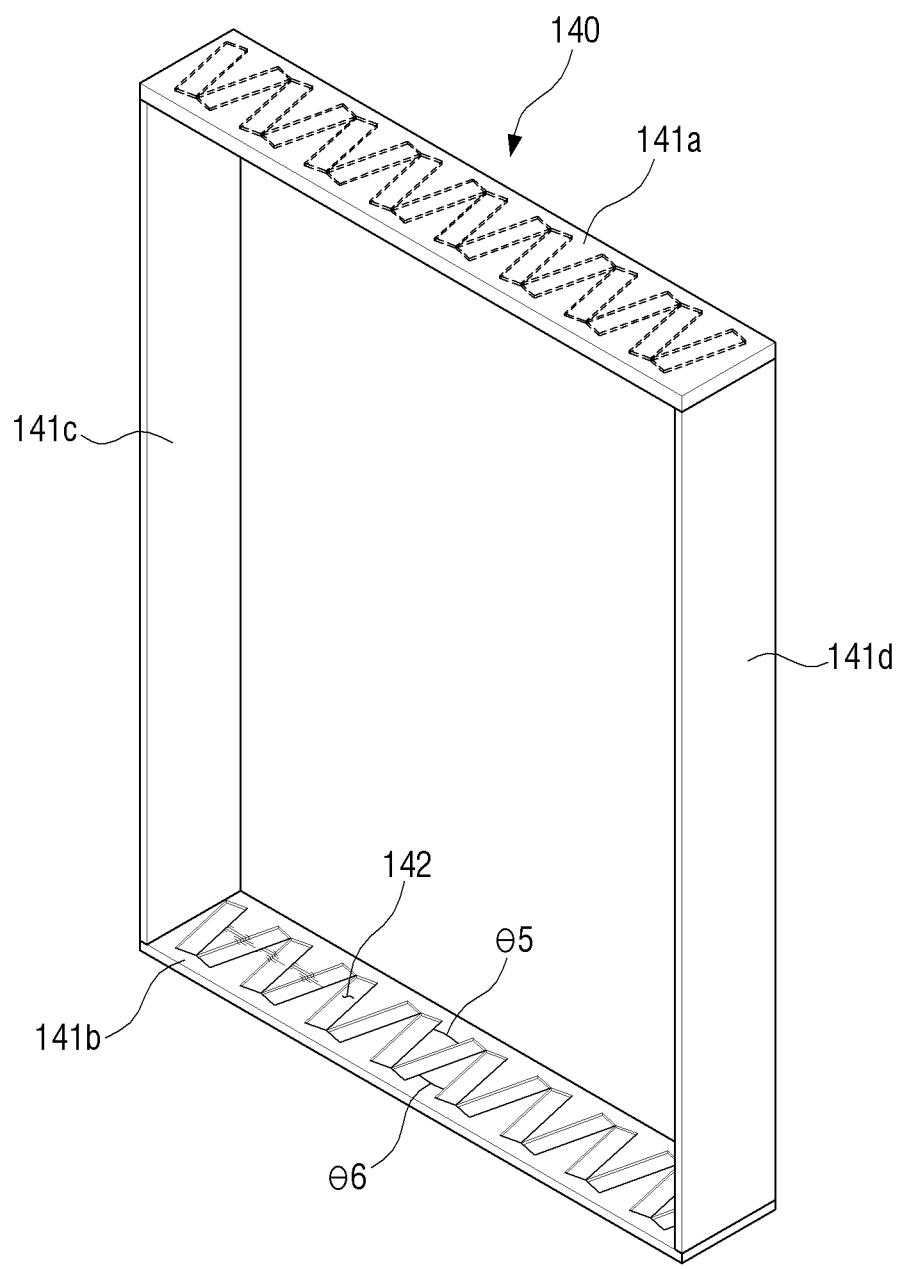
FIG. 8 is a perspective view showing another example of a frame.

FIG. 8 is a perspective view showing another example of a frame 140.

Referring to FIG. 8, the frame 140 has an upper portion 141a, a lower portion 141b, a left portion 141c, and a right portion 141d in the same manner as the frame 130 shown in FIG. 7. A plurality of guide portions are formed on a bottom surface of the upper portion 141a of the frame 140 and a top surface of the lower portion 141b.

Each guide portion may be an engagement groove 142 into which the upper ends 110a and the lower ends 110b of the plurality of filter modules 110 may be inserted. The plurality of engagement grooves 142 are arranged to form angles θ5 and θ6 corresponding to the angles θ1 and θ2 (see FIG. 4) formed by the plurality of filter modules 110. Accordingly, the plurality of filter modules 110 connected in a line may be fixed by the frame 140 while maintaining the predetermined angles.

Also, the plurality of filter modules 110 may maintain predetermined angles to the frames 130 and 140 by rib-shaped guide portions or groove-shaped guide portions. However, the present disclosure is not limited thereto, and the plurality of filter modules 110 may maintain predetermined angles by bonding the upper ends 110*a* and the lower ends 110*b* to the bottom surface of the upper portion and the top surface of the lower portion of each of the frames 130 and 140. In this case, it is not necessary to form a separate guide portion in the frames 130 and 140.

The filter assembly 100 including the plurality of filter modules 110 and the frames 130 and 140 may be detachably inserted into the receiving groove 17 of the main body 10 as described above. The filter assembly 100 may be easily taken from the receiving groove 17 of the main body 10 when the filter lifespan is exhausted or when repair is required.

Hereinafter, the arrangement angle between the filter modules 110 and the effect thereof will be described in detail with reference to FIGS. 9 to 12.

Figure 9:
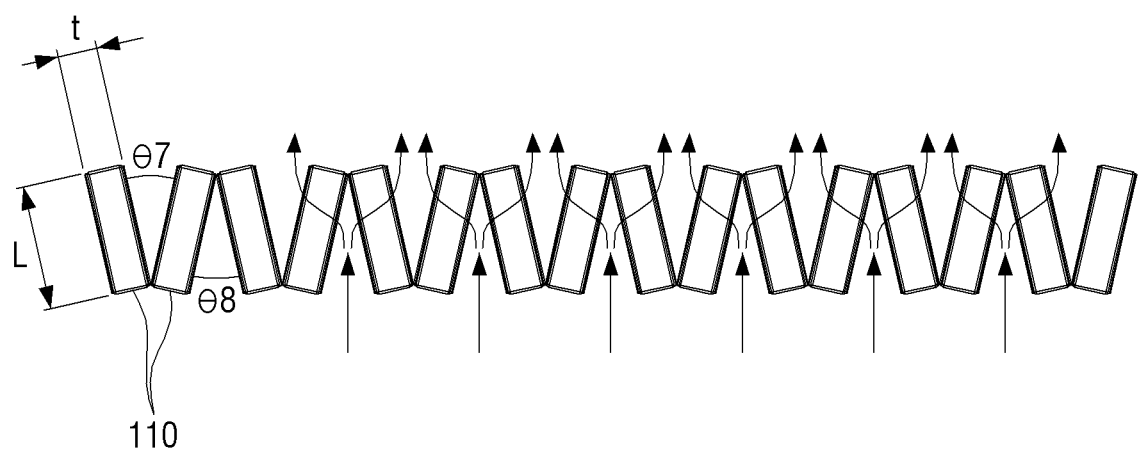
FIG. 9 is a plan view showing a plurality of filter modules arranged at first angles.
Figure 10:
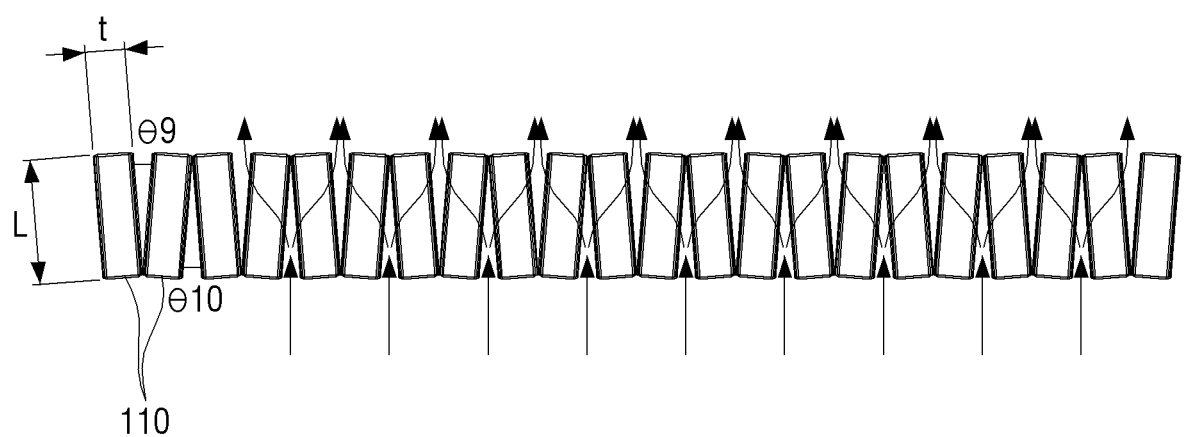
FIG. 10 is a plan view showing the plurality of filter modules arranged at second angles narrower than the first angles.

FIG. 9 is a plan view showing the plurality of filter modules 110 arranged at first angles θ7 and θ8 relative to each other. FIG. 10 is a plan view showing the plurality of filter modules 110 arranged at second angles θ9 and θ10 relative to each other narrower than the first angles θ7 and θ8.

Referring to FIG. 9, the plurality of filter modules 110 are disposed in a zigzag manner at the certain first angles θ7 and θ8 relative to each other. In this case, the angles θ7 and θ8 between the filter modules 110 may be the same angle.

Referring to FIG. 10, the angles between each filter module 110 may be the second angles θ9 and θ10 narrower than the first angles θ7 and θ8, if necessary. At this time, the second angles θ9 and θ10 may be the same angle.

Each filter module 110 may have a width L of about 10 mm to 60 mm. When the width L of the filter module 110 is less than 10 mm, since the contact area of the filter in contact with air becomes narrow, the pressure loss increases, the CADR decreases, and the deodorization performance is greatly deteriorated. On the contrary, when the width L of the filter module 110 exceeds 60 mm, although the contact area of the filter in contact with air becomes wider, since the volume of the filter assembly 100 becomes larger, there is a problem that the entire size of an air cleaner increases.

Figure 11:
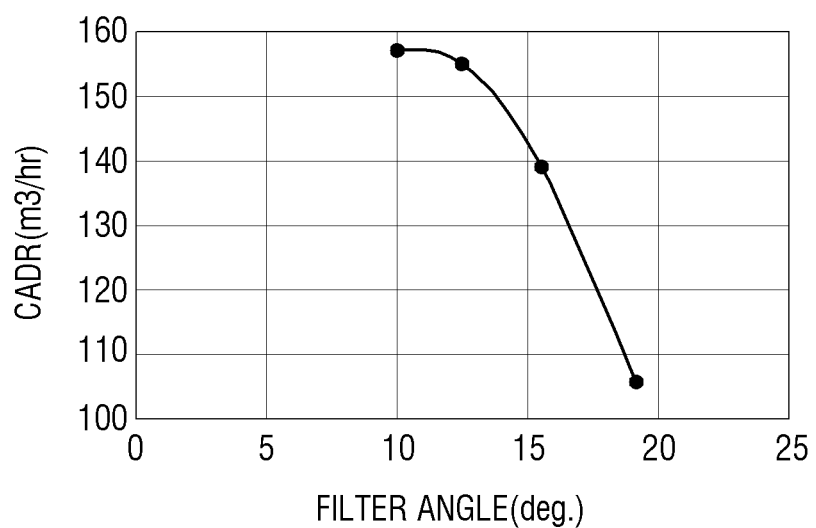
FIG. 11 is a graph showing the relationship between the filter angle and a CADR (clean air delivery rate)
Figure 12:
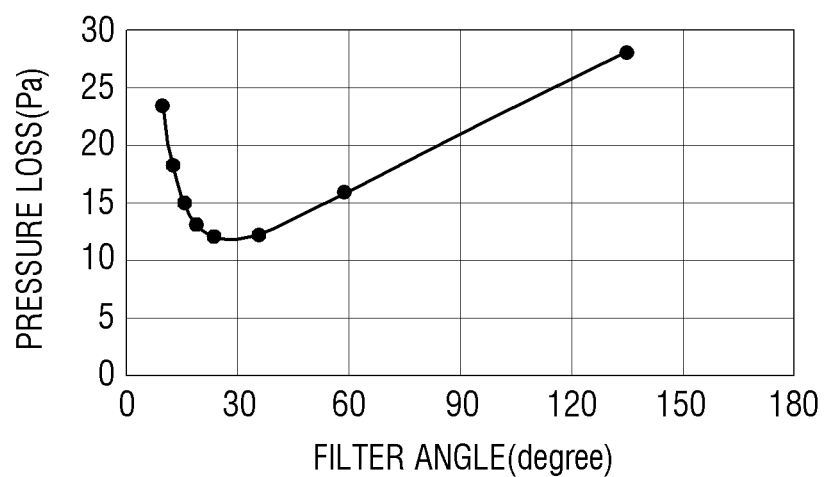
FIG. 12 is a graph showing the relationship between the filter angle and the pressure loss.

FIG. 11 is a graph showing the relationship between the filter angle and the CADR. FIG. 12 is a graph showing the relationship between the filter angle and the pressure loss.

The conventional honeycomb-shaped filter assembly has the pressure loss of about 18 Pa and the CADR of 50 m3/h when 70% of activated carbon is filled in a plurality of cells. Also, when a plurality of cells were filled with 100% activated carbon, the pressure loss was over 196 Pa and the CADR was close to 0.

To the contrary, the filter assembly 100 according to the present embodiment includes the plurality of filter modules 110 disposed in a zigzag manner such that the area of a filter through which air may pass is wider than that of the conventional honeycomb-shaped filter assembly. Therefore, even if the cells 111 of the plurality of filter modules 110 are fully filled with activated carbon, since the area of the filter through which air may pass is wide, an increase in pressure loss may be prevented and a high CADR may be obtained. That is, as shown in the graphs of FIGS. 11 and 12, it may be seen that when the plurality of filter modules 110 filled with the activated carbon 115 in the plurality of cells 111 are arranged at 10 to 30 degrees, the maximum value of the pressure loss is less than 24 pa and the CADR is the maximum of 155 m3/h.

Considering this point, it may be seen that as shown in FIGS. 11 and 12, the plurality of filter modules 110 in which the plurality of cells 111 are filled with activated carbon by 100% have a low pressure loss and a high CADR value. Accordingly, it may be seen that the plurality of filter modules 110 arranged in a zigzag manner at predetermined angles have better deodorization performance than the conventional honeycomb-shaped deodorization filter. Also, the plurality of filter modules 110 arranged in the zigzag manner at predetermined angles relative to each other have different CADRs according to the angles between the filter modules 110.

Hereinafter, obtaining different CADRs by differently setting angles between the filter modules 110 will be described with reference to FIGS. 13 and 14.

Figure 13:
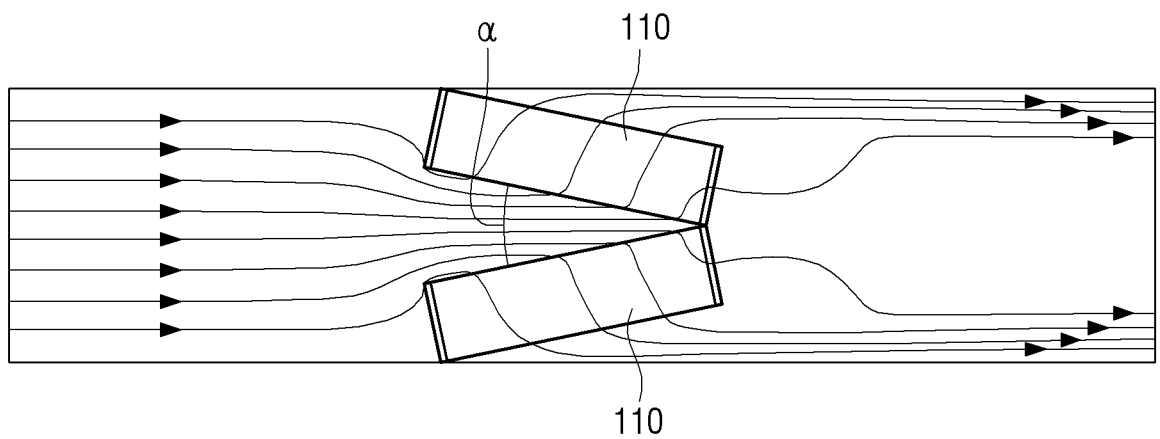
FIG. 13 is a diagram showing a simulation result when an angle between the filter modules is 25.6 degrees.
Figure 14:
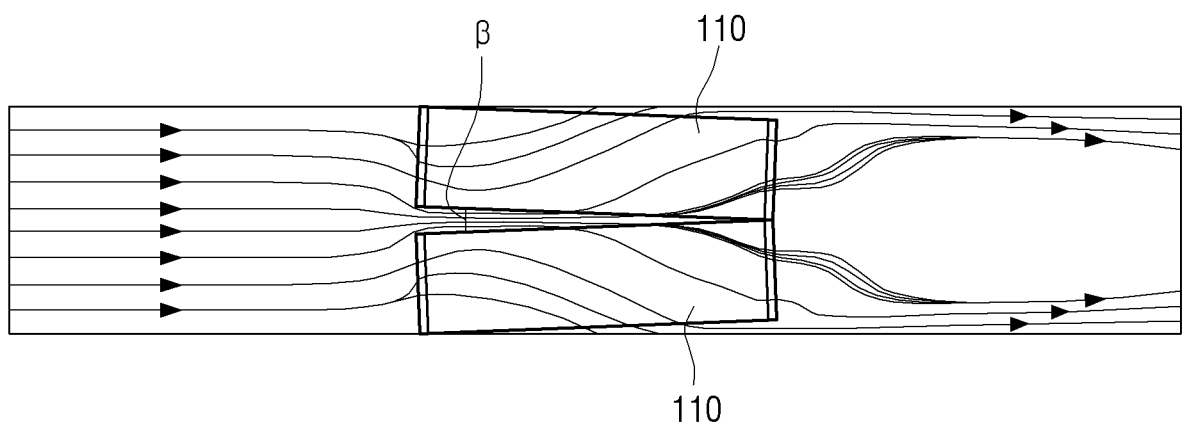
FIG. 14 is a diagram showing a simulation result when the angle between the filter modules is 5.5 degrees.

FIG. 13 is a diagram showing a simulation result when an angle between the filter modules is 25.6 degrees. FIG. 14 is a diagram showing a simulation result when the angle between the filter modules is 5.5 degrees.

As shown in FIG. 13, when an angle α of the filter module 110 is 10 to 30 degrees, the flow path of air passing through the filter module 110 substantially coincides with a direction of the filter thickness t. The flow path of air passing through the filter module 110 is shortened (i.e., the air flow path is close to the shortest distance), and accordingly, the pressure loss of air passing through the filter module 110 is reduced and the CADR is increased. Also, referring to FIGS. 11 to 12, when the angle α of the filter module 110 is 10 to 30 degrees, the CADR has a maximum value of 155 m3/h and when the angle α of the filter module 110 increases, the CADR value gradually decreases. Further, it may be seen that the pressure loss is 12 to 24 Pa, which is a low pressure loss considering that the pressure loss of the conventional honeycomb-shaped filter module is 196 Pa.

Meanwhile, when an angle β of the filter module 110 is less than 10 degrees, the flow path of air passing through the filter module 110 does not coincide with the direction of the filter thickness t. Accordingly, the air flow path passing through the filter module 110 becomes increasing. This increases the pressure loss of air passing through the filter module 110 and reduces the CADR.

When the angle β of the filter module 110 exceeds 30 degrees, the flow path of air passing through the filter module 110 will substantially coincide with the direction of the filter thickness t. However, when the angle β of the filter module 110 increases, since the contact area of the filter through which air may pass becomes narrower, the pressure loss of the air increases more than when the angle of the filter module 110 is 10 to 30 degrees and the CDR will decrease. Also, referring to FIG. 12, it may be seen that when the angle of the filter module 110 increases exceeding 30 degrees, the pressure loss also increases. However, even when the angle of the filter module 110 is 130 degrees, the pressure loss has the maximum of 28 Pa, which is a low pressure toss considering that the pressure loss of the conventional honeycomb-shaped filter module is 196 Pa.

As described above, it may be seen that the maximum CADR value is obtained when the angle of the filter module 110 is 10 degrees, and the minimum pressure loss is obtained when the angle is 30 degrees. Therefore, considering that the pressure loss of air passing through the filter module 110 and the CADR are both main variables of the deodorization performance, the most ideal deodorization performance may be realized when the angle of the filter module 110 is 10 to 30 degrees, preferably 25 to 30 degrees.

However, the present disclosure is not limited thereto, and it is obvious that the angle between the filter modules 110 may be adjusted according to design needs.

Although exemplary embodiments of the present disclosure have been illustrated and described, the present disclosure is not limited to the abovementioned specific exemplary embodiments, but may be variously modified by those skilled in the art to which the present disclosure pertains without departing from the spirit and scope of the present disclosure as claimed in the claims. Also, such modifications should also be understood to fall within the scope of the present disclosure.

The invention claimed is:

1. A filter assembly comprising:
 a plurality of filter modules having a quadrilateral shape and continuously connected to each other and disposed at predetermined angles relative to each other, and each filter module of the plurality of filter modules including a plurality of cells filled with activated carbon;
 a frame to which an upper end and a lower end of each filter module of the plurality of filter modules are fixed;
 a plurality of air passages holes spaced apart from each other on a front surface and a rear surface of each filter module of the plurality of filter modules and along a longitudinal direction of the plurality of filter modules, and connected to the plurality of cells; and
 a plurality of net members respectively corresponding to pairs of adjacent filter modules of the plurality of filter modules so that a respective net member of the plurality of net members extends between the filter modules of the corresponding pair of adjacent filter modules to fasten the filter modules at a predetermined angle so that a side surface of one of the filter modules and a side surface of the other filter module face each other.

2. The filter assembly as claimed in claim 1, wherein the plurality of filter modules are disposed in a zigzag manner relative to each other.

3. The filter assembly as claimed in claim 1, wherein each of the plurality of net members has a mesh smaller than a particle size of the activated carbon.

4. The filter assembly as claimed in claim 1, wherein the predetermined angles between the plurality of filter modules are between 10 and 30 degrees.

5. The filter assembly as claimed in claim 1, wherein the frame includes a plurality of guide portions fixing the upper end and the lower end of each filter module of the plurality of filter modules to maintain the plurality of filter modules at the predetermined angles.

6. The filter assembly as claimed in claim 5, wherein the plurality of guide portions are engagement grooves into which the upper end and the lower end of each filter module of the plurality of filter modules are inserted.

7. The filter assembly as claimed in claim 5, wherein the plurality of guide portions are protruding ribs to correspond to outer sides of the upper end and the lower end of each filter module of the plurality of filter modules.

8. The filter assembly as claimed in claim 1, wherein the upper end and the lower end of each filter module of the plurality of filter modules are attached to an inner surface of the frame.

9. An air cleaner comprising:
 a main body including an air outlet and a suction motor;
 a front cover detachably mounted to the main body and including an air inlet, wherein the suction motor is configured to suck air into the air inlet and the air is discharged to an outside of the main body through the air outlet; and
 a filter assembly disposed downstream of the air inlet, wherein the filter assembly includes:
  a plurality of filter modules having a quadrilateral shape and arranged in a zigzag manner and disposed at predetermined angles relative to each other, and each filter module of the plurality of filter modules including a plurality of cells filled with activated carbon,
  a frame to which an upper end and a lower end of each filter module of the plurality of filter modules are fixed,
  a plurality of net members respectively corresponding to pairs of adjacent filter modules of the plurality of filter modules so that a respective net member of the plurality of net members extends between the filter modules of the corresponding pair of adjacent filter modules to fasten the filter modules at a predetermined angle so that a side surface of one of the filter modules and a side surface of the other filter module face each other.

10. The air cleaner as claimed in claim 9, wherein each of the plurality of net members has a mesh smaller than a particle size of the activated carbon.

11. The air cleaner as claimed in claim 9, wherein the predetermined angles between the plurality of filter modules are between 10 and 30 degrees.

12. The air cleaner as claimed in claim 9, wherein the frame includes a plurality of guide portions fixing the upper end and the lower end of each filter module of the plurality of filter modules to the frame.

* * * * *